United States Patent [19]

Lange et al.

[11] Patent Number: 5,442,582
[45] Date of Patent: Aug. 15, 1995

[54] TRANSVERSAL FILTER ALLRATE EQUALIZER FOR USE AT INTERMEDIATE FREQUENCY

[75] Inventors: Julius Lange, Sunnyvale; Elbert L. Turner, San Jose, both of Calif.

[73] Assignee: Loral Aerospace Corp., New York, N.Y.

[21] Appl. No.: 206,065

[22] Filed: Mar. 4, 1994

[51] Int. Cl.$^6$ .................. G06G 7/02; G06F 15/31
[52] U.S. Cl. ...................... 364/825; 364/724.16; 375/235
[58] Field of Search .............. 364/825, 724.01, 724.16, 364/724.05, 724.2; 375/234–235

[56] References Cited

U.S. PATENT DOCUMENTS

| | | | |
|---|---|---|---|
| 4,149,259 | 4/1979 | Kowalski | 364/724.05 |
| 4,797,844 | 1/1989 | Jackson | 364/724.01 |
| 5,311,459 | 5/1994 | D'Luna et al. | 364/724.16 |

Primary Examiner—Tan V. Mai
Attorney, Agent, or Firm—Kenneth W. Float; Anthony W. Karambelas

[57] ABSTRACT

A transversal filter allrate equalizer for use at intermediate frequency. The equalizer includes a signal divider coupled to receive the intermediate frequency input signal and a transversal filter comprising a plurality of analog delay lines and a plurality of multiplying circuits. The plurality of analog delay lines are coupled to the signal divider for producing a time-shifted replica of an intermediate frequency input signal. The plurality of multiplying circuits are respectively coupled to the delay lines for weighting the time-shifted replicas of the input signal by complex numbers, $W_i$. A signal combiner is coupled to the plurality of multiplying circuits for recombining the time-shifted and weighted replicas of the input signal to produce an equalized output signal. The delay lines operate at an intermediate frequency, and produce a time delay for the modulation and a phase shift for the carrier. The phase shift may be compensated for by adjusting the phases of the tap weights, $W_i$. The equalizer reduces distortion and intersymbol interference in high data rate digital communications systems, such as modems, and the like.

5 Claims, 2 Drawing Sheets

TRANSVERSAL FILTER ALLRATE EQUALIZER FOR USE AT INTERMEDIATE FREQUENCY

BACKGROUND

The present invention relates generally to transversal filters, and more particularly, to a transversal filter allrate equalizer for use at intermediate frequency.

Transversal filter equalizers operating at baseband have been used extensively in high rate digital modems to improve data quality by compensating for amplitude and delay distortion. By way of example, a conventional adaptive baseband equalizer may be comprised of four transversal filters (two pair) and two adaptive control circuits. Two of the transversal filters (one pair) process the I samples and the remaining two transversal filters (the other pair) process the Q samples. Each adaptive control circuit is coupled to one transversal filter from each pair. The transversal filters operate in a frequency range from DC to a maximum frequency on the order of the data rate and the filter weights are real numbers, not complex numbers. The adaptive control circuits generate weights for the transversal filters that are required to minimize the distortion at the outputs. Many well-known algorithms may be used to accomplish this.

Transversal filter equalizers may be used with many PSK and QAM modulation schemes, including QPSK, MSK, 8PSK, and 16 QAM. The transversal filter equalizer is typically disposed between a quadrature demodulator and a data detector of a modem, for example. The distorted I or Q symbol waveform received from the data detector is processed by the transversal filter equalizer. For a typical symbol, the contribution of energy at sampling times used by a decision circuit in the equalizer other than its own sampling instant are zero. In other words, zero voltage crossovers for the symbol occur exactly at adjacent symbol sampling instants. If any energy exists during these adjacent sampling instants, then these adjacent bits may be detected in error, thus increasing the bit error rate. A corrected bit waveform formed after passing through a high quality adaptive baseband equalizer is such that the voltages at all sampling points, except for the main bit, are zero. Thus the adaptive baseband equalizer contributes significantly to the low error performance of a modem, for example.

Conventional equalizers are disclosed in the following U.S. patents and publication. U.S. Pat. No. 3,878,468 issued to Falconer et al. describes a conventional baseband equalizer. In this invention the base-band I and Q signals are recovered by sampling the IF and are processed in separate transversal filters. U.S. Pat. No. 3,974,449 issued to Falconer describes an improvement to the U.S. Pat. No. 3,878,468 invention by using several feed forward taps in addition to the transversal filter. U.S. Pat. No. 4,422,175 issued to Bingham et al. describes methods relating to a baseband equalizer. This patent illustrates methods of deriving the tap weights, not the transversal filter itself. U.S. Pat. No. 4,594,725 issued to Desperben et al. discloses a conventional transversal equalizer. U.S. Pat. No. 4,607,377 issued to Atobe et al. describes methods relating to deriving the tap weights. The implementation of the transversal filter is at baseband. A publication entitled "Jointly Adaptive Equalization and Carrier Recovery in Two-Dimensional Digital Communication Systems", by D. D. Falconer, AT&T, BSTJ, March 1979, pp. 317–333, describes a conventional baseband equalizer. In the circuit, described in this paper, the base-band I and Q signals are recovered by sampling the IF and are processed in separate transversal filters.

U.S. Pat. No. 4,475,211 issued to Mattis, Jr. et al. discloses a transversal equalizer that performs equalization at IF, demodulates the input signal and then generates the equalization coefficients at baseband from the demodulated data. The Mattis patent discloses an equalizer at IF, but uses whole symbol period delays and thus is not applicable to multirate or allrate operation. Also delay lines operating at IF produce not only a time delay for the modulation but also a phase shift for the carrier. This phase shift can be compensated for by adjusting the phases of the tap weights, $W_i$. The Mattis patent does not deal with this phase shift problem, even though it does include an adaptive controller.

However, conventional equalizers are relatively complex, because they operate at baseband and the frequency response has to be uniform over many octaves, from DC, or almost DC, to at least the data symbol rate. Also the multipliers are many in number and very complex due to the aforementioned frequency response. Furthermore the delay paths generally must be hand tuned. Therefore, it is an objective of the present invention to provide for a transversal filter allrate equalizer that operates at intermediate frequency that overcomes some of the limitations of conventional equalizers.

SUMMARY OF THE INVENTION

The present invention is a transversal filter allrate equalizer for use at intermediate frequency. The transversal filter allrate equalizer comprises a signal divider coupled to receive the intermediate frequency input signal and a plurality of delay lines coupled to signal divider for producing a time-shifted replica of the IF input signal. A plurality of multiplying circuits are respectively coupled to the delay lines for weighting the time-shifted replicas of the input signal by complex numbers, $W_i$. A signal combiner is coupled to the plurality of multiplying circuits for recombining the time-shifted and weighted replicas of the input signal to produce an equalized output signal. The delay lines operate at an intermediate (IF) frequency, and produce a time delay for the modulation and a phase shift for the carrier. The phase shift may be compensated for by adjusting the phases of the tap weights, $W_i$.

The present transversal filter allrate equalizer operates at intermediate frequency (IF) in contrast to conventional equalizers that operate at baseband. An incoming signal $IF_{in}$ is divided into a number of paths each having a delayed line. The signals are then weighted by complex numbers $W_i$ applied to multiplying circuits. In conventional equalizers, the weights are real numbers. The weighted signals are recombined to produce an equalized output signal $IF_{out}$.

In contrast with the Mattis, Jr. et al. patent, cited above, the present invention uses fractional delays, such as one-half symbol periods, which reduces the required accuracy of the delay and makes allrate operation possible. The Mattis patent uses whole symbol period delays and thus is not applicable to multirate or allrate operation. Because delay lines operating at IF produce not only a time delay for the modulation but also a phase shift for the carrier, this phase shift may be compensated for in the present equalizer by adjusting the phases of the tap weights, $W_i$.

The present invention is designed to operate at intermediate frequency, not at baseband frequency as in conventional equalizers. The present invention reduces distortion and intersymbol interference in high data rate digital communications systems, such as modems and the like. The present invention has a multiplier design that is simplified from conventional designs, since there is no requirement for low frequency response. Existing monolithic microwave integrated circuits (MMIC) modulator designs may be readily adapted for this purpose. The number of multipliers required by the present invention is less by a factor of four than a conventional baseband equalizer with I/Q crosstaps. One IF multiplier takes the place of four baseband multipliers. Tap delays are not very critical, since the tap spacing is so small. Therefore, the delays do not have to be hand tuned, as with an equalizer with a tap spacing of one symbol period. There is no need to readjust the equalizer when the data rate is changed, as long as the RF and IF filter characteristics remain the same.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
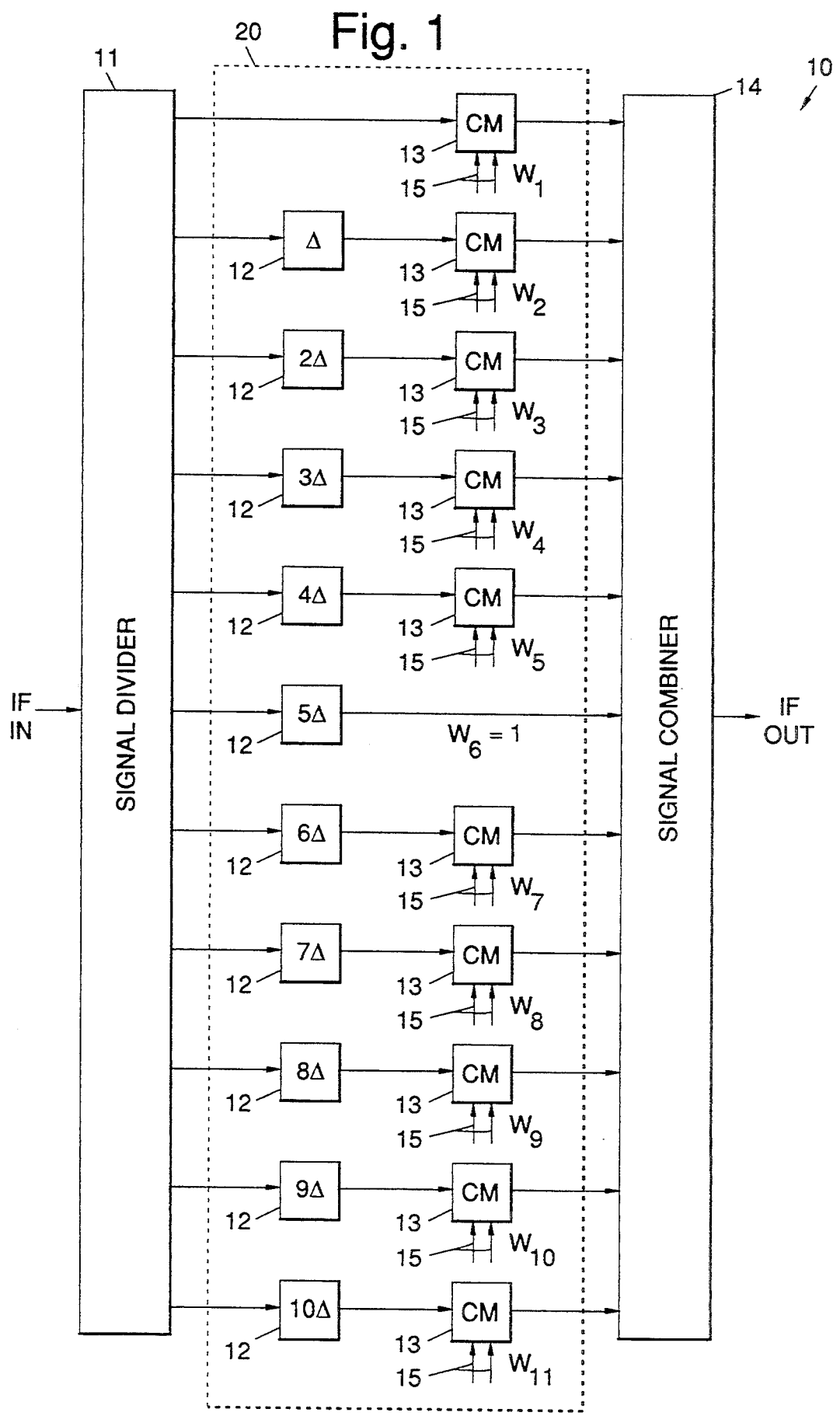
FIG. 1 illustrates a block diagram of a transversal filter allrate equalizer in accordance with the principles of the present invention.

Referring to the drawing figures, FIG. 1 illustrates a block diagram of a transversal filter allrate equalizer 10, which is implemented in the form of a transversal filter, in accordance with the principles of the present invention. As with conventional adaptive equalizer implementations, an incoming signal (IF IN), in this case at intermediate frequency (IF) not baseband, is divided into several paths, using a signal divider 11, and are input to a plurality of delay lines 12 that are coupled to a plurality of multiplying circuits 13. The delay lines 12 may also be placed after the multiplying circuits 13. The plurality of delay lines 12 comprise analog delay lines 12.

Each path from the signal divider 11 has its own delay line 12, which produces a time-shifted replica of the IF input signal. The time-shifted replicas are weighted by complex numbers, or tap weights 15 ($W_j$), using the multiplying circuits 13 (CM) coupled to each respective delay line 12 (except for the sixth delay line 12 wherein the tap weights 15 are equal to 1). The time-shifted and weighted replicas are then recombined in a signal combiner 14 to produce an equalized output signal (IF OUT). Since the delay lines 12 are operating at an intermediate (IF) frequency, they not only produce a time delay for the modulation, but also a phase shift for the carrier. This phase shift may be compensated for by adjusting the phases of the tap weights 15 ($W_j$).

Figure 2:
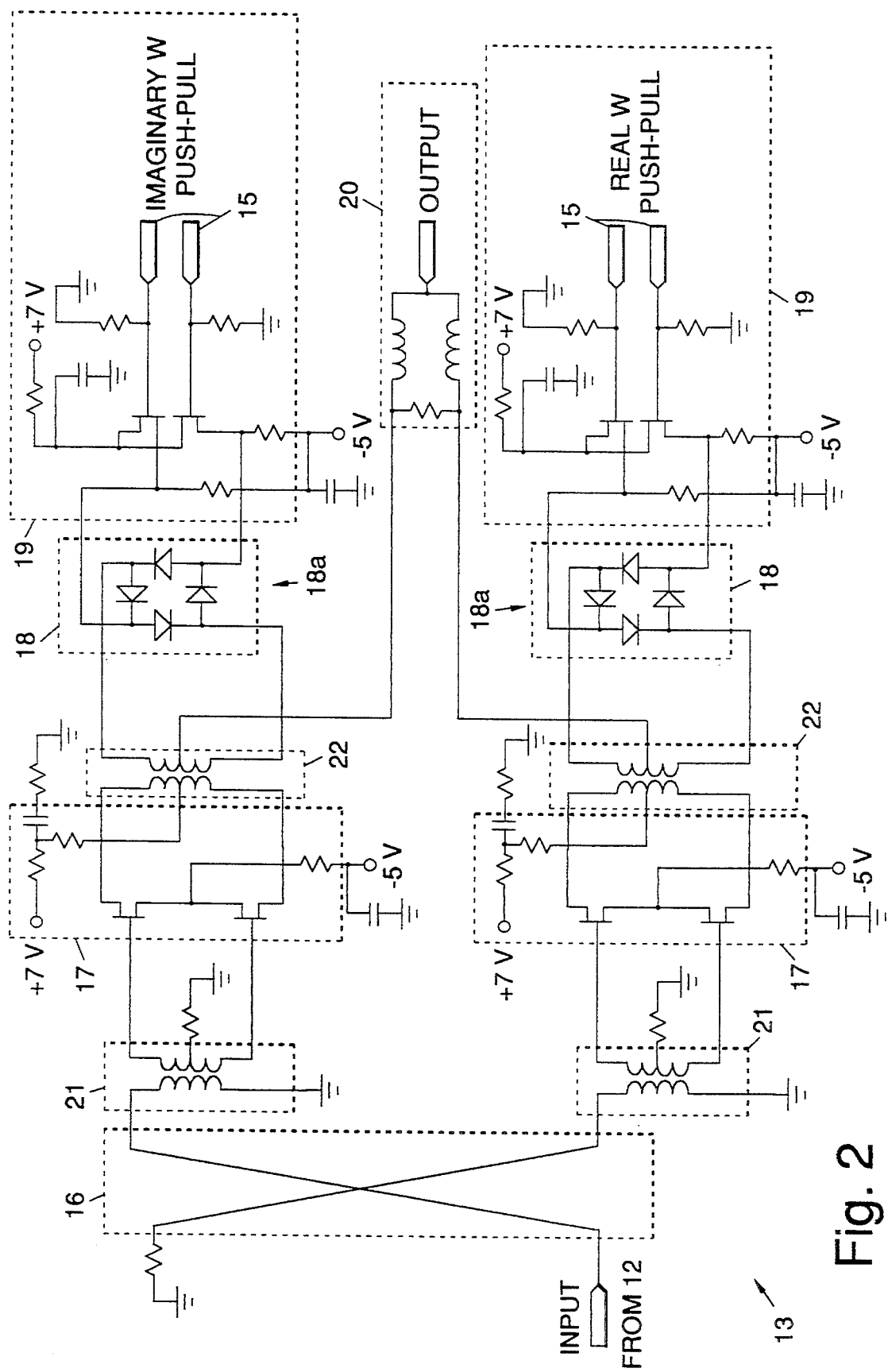
FIG. 2 illustrates an implementation of the complex multipliers, CM, employed in the equalizer of FIG. 1, using a MMIC modulator design.

FIG. 2 illustrates an implementation of the complex multiplying circuits 13 employed in the equalizer 10 of FIG. 1, using a monolithic microwave integrated circuit (MMIC) quadrature modulator design. The multiplying circuits 13 multiply the incoming signal by a complex number W, thereby changing its amplitude and phase. A "complex" number W is a pair of numbers that comprise a "real part" and an "imaginary part". The real and the imaginary parts of W are presented to the control terminals for the tap weights 15 in the form of analog voltages. A detailed description of the signal flow is given below.

The signal first enters a phase shift network 16, that splits the signal into two replicas shifted 90° with respect to each other. The phase shift network 16 is implemented as an interdigitated quadrature coupler. The two signals then pass through center-tapped transformers 21, amplifiers 17, center-tapped transformers 22, and four-quadrant multipliers 18. The four-quadrant multipliers 18 are implemented as double balanced ring diode mixers 18a. Control voltages, REAL W and IMAGINARY W, are applied to the mixers 18a after passing through the amplifiers 19. The two outputs from the mixers 18a are then combined in the in-phase combiner 20 to form the output signal.

FIG. 2 shows a preferred embodiment of the invention. There may be minor rearrangements or substitutions of the components shown in FIG. 2. For example, another type of 90° phase shift network 16 may be used, active circuits may be substituted for the transformers 21, 22, or Gilbert cells may be used for the four-quadrant multipliers 18. The multiplying circuit 13 is self-contained, having built-in phase shift networks 16, signal combiners 20, and center-tapped transformers 21, 22. In conventional equalizers these components are external to the multiplying circuits 13, adding greatly to the complexity of the design.

Conventional fixed rate equalizers generally have tap delays spaced at exactly the symbol period. For the present allrate equalizer 10, which operates over a continuous range of rates, the Nyquist criterion requires sampling at twice the symbol rate or more. Therefore, the tap spacing must be equal to or less than one-half symbol period at the highest data rate. Therefore, a larger number of taps is required, at least twice as many as a conventional fixed rate equalizer design at the highest rate.

The present equalizer 10 has several advantages over a conventional adaptive baseband equalizer. The multiplying circuits 13 is simplified, since there is no requirement for a low frequency response. Existing monolithic microwave integrated circuits (MMIC) modulator designs may be easily adapted for this purpose, such as is shown in FIG. 2, for example. The use of quadrature modulators, sometimes called vector modulators or QPSK modulators, may be employed as the complex multiplying circuits 13. Such quadrature modulators are conventional components widely available in various embodiments. The required number of transversal filters 20, and therefore multiplier circuits 13, is lower by a factor of four, as compared to a baseband equalizer with I/Q crosstaps. For example, a conventional adaptive baseband equalizer would have four transversal filters instead of the single transversal filter 20 shown in the equalizer 10 of FIG. 1. The tap delay paths 12 are not very critical, because fractional tap spacings are used with equivalent sampling rates at twice symbol rate or higher. Therefore, the delay paths 12 need not be hand tuned, as with an equalizer with a tap spacing of one symbol period.. There is also no need to readjust the present equalizer 10 when the data rate is changed, as long as the RF and IF filter characteristics remain the same.

The present transversal filter allrate equalizer 10 has clear advantages for data reception in the presence of high distortion, high phase jitter, high data clock jitter, and/or high noise. Equalization at an intermediate frequency always precedes clock and carrier recovery, presenting phase locked loop (PLL) circuits in a modem with a clean fully equalized signal. In contrast, most conventional systems with transversal filter equalizers use an unequalized signal. This is true for clocked delay, time discrete, and sampled equalizer implementations. The present transversal filter allrate equalizer 10 uses analog delay lines which do not require a clock.

The present invention has been designed for use in an adaptive equalizer, and although not described above, there are many available methods for choosing appropriate tap weights, $W_i$, or changing them adaptively to meet changing conditions. Many methods, implemented in either hardware, software, or a combination of the two, are described in the literature that may be used to achieve this, and which may be readily implemented for use in the present invention.

Thus there has been described a new and improved transversal filter allrate equalizer for use at intermediate frequency. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A transversal filter allrate equalizer for equalizing an intermediate frequency input signal, said equalizer comprising:
   a signal divider coupled to receive the intermediate frequency input signal;
   a transversal filter comprising:
   a plurality of delay lines coupled to signal divider for producing time-shifted replicas of the intermediate frequency input signal; and
   a plurality of multiplying circuits respectively coupled to the delay lines for weighting the time-shifted replicas of the input signal by complex numbers; and
   a signal combiner coupled to the plurality of multiplying circuits for recombining the time-shifted and weighted replicas of the input signal to produce an equalized output signal.

2. The transversal filter allrate equalizer of claim 1 wherein the delay lines operate at an intermediate frequency, and produce a time delay for the modulation, and a phase shift for the carrier.

3. The transversal filter allrate equalizer of claim 2 wherein the phase shift is compensated for by adjusting the phases of the tap weights.

4. The transversal filter allrate equalizer of claim 1 wherein the plurality of multiplying circuits comprise four-quadrant multipliers.

5. The transversal filter allrate equalizer of claim 4 wherein the four-quadrant multipliers each comprise a double balanced ring diode mixer.

* * * * *